US012613505B2

(12) United States Patent
Shadbolt et al.

(10) Patent No.: US 12,613,505 B2
(45) Date of Patent: Apr. 28, 2026

(54) CONTROL SYSTEMS FOR HEAT TRANSFER SYSTEMS, AND RELATED HEAT TRANSFER SYSTEMS

(71) Applicant: CoolIT Systems, Inc., Calgary (CA)

(72) Inventors: Victor Shadbolt, Calgary (CA); Renee Cousins, Calgary (CA); Daniel Placzek, Calgary (CA)

(73) Assignee: CoolIT Systems, Inc., Calgary (CA)

( * ) Notice: Subject to any disclaimer, the term of this patent is extended or adjusted under 35 U.S.C. 154(b) by 799 days.

(21) Appl. No.: 17/698,913

(22) Filed: Mar. 18, 2022

(65) Prior Publication Data

US 2022/0299966 A1 Sep. 22, 2022

Related U.S. Application Data

(60) Provisional application No. 63/174,074, filed on Apr. 13, 2021, provisional application No. 63/163,661, filed on Mar. 19, 2021.

(51) Int. Cl.
*G05B 19/042* (2006.01)

(52) U.S. Cl.
CPC .................... *G05B 19/0428* (2013.01); *G05B 2219/24015* (2013.01); *G05B 2219/24216* (2013.01)

(58) Field of Classification Search
CPC ...... G05B 19/0428; G05B 2219/24015; G05B 2219/24216
See application file for complete search history.

(56) References Cited

U.S. PATENT DOCUMENTS

| | | | | |
|---|---|---|---|---|
| 5,271,474 A | * | 12/1993 | Nishimoto | ........... B62D 5/0493 |
| | | | | 180/404 |
| 7,508,665 B1 | * | 3/2009 | Palmer | ................. H05K 7/2079 |
| | | | | 361/696 |

(Continued)

FOREIGN PATENT DOCUMENTS

| | | |
|---|---|---|
| CN | 203981853 U | 12/2014 |
| JP | H07101865 B2 * | 11/1995 |

(Continued)

OTHER PUBLICATIONS

JPH07101865B2 (English Translation) Shimizu; Hiroyuki, Frequency setting method for wireless transmitter. (Year: 1995).*

(Continued)

*Primary Examiner* — Robert E Fennema
*Assistant Examiner* — Marzia T Monty
(74) *Attorney, Agent, or Firm* — WORKMAN NYDEGGER

(57) ABSTRACT

A controller for controlling operation of a heater transfer system is supervised by a supervisory control logic. Supervisory control logic monitors a state-of-health of system control logic, e.g., by monitoring an output from the system control logic that is indicative of its state-of-health. In a working embodiment, supervisory control logic monitors an output signal, e.g., a strobe signal, emitted by the system control logic. Response to a detected change in the control logic's health (e.g., a deterioration in performance), the supervisory control logic can issue a command or signal, or otherwise cause the system control logic to perform a selected one or more other operations selected from a plurality of operations.

18 Claims, 6 Drawing Sheets

(56) References Cited

U.S. PATENT DOCUMENTS

| | | | | |
|---|---|---|---|---|
| 8,857,057 B2 * | 10/2014 | Campbell | .......... | H05K 7/20781 |
| | | | | 29/890.03 |
| 9,052,252 B2 | 6/2015 | Lyon | | |
| 10,678,529 B1 * | 6/2020 | Farhan | .................... | H04L 67/34 |
| 11,889,928 B2 * | 2/2024 | Karschnik | ............ | A47C 27/084 |
| 2006/0178786 A1 | 8/2006 | Bhagwath et al. | | |
| 2008/0027568 A1 | 1/2008 | Pearson | | |
| 2008/0117960 A1 * | 5/2008 | Panis | .............. | G01R 31/31709 |
| | | | | 375/226 |
| 2008/0294297 A1 * | 11/2008 | Bretzner | ................ | G05D 23/19 |
| | | | | 700/300 |
| 2011/0210257 A9 * | 9/2011 | Handique | .......... | G01N 21/6428 |
| | | | | 250/366 |
| 2014/0009166 A1 * | 1/2014 | Kaltenegger | ....... | G06F 11/0757 |
| | | | | 324/537 |
| 2014/0266744 A1 | 9/2014 | Lyon et al. | | |
| 2019/0079134 A1 * | 3/2019 | Donolo | .............. | G01R 31/3278 |
| 2019/0116694 A1 | 4/2019 | Lyon et al. | | |
| 2019/0262525 A1 * | 8/2019 | Wyeth | ................. | A61M 1/1565 |
| 2020/0363855 A1 | 11/2020 | Basterash et al. | | |

FOREIGN PATENT DOCUMENTS

| | | |
|---|---|---|
| JP | 2006-163919 A | 6/2006 |
| JP | 2009-123082 A | 6/2009 |
| JP | 2011-069581 A | 4/2011 |
| JP | 2011-096088 A | 5/2011 |
| WO | 2017/012172 A1 | 1/2017 |

OTHER PUBLICATIONS

International Search Report and Written Opinion for PCT Application No. PCT/IB2022/052559, mailed Jun. 17, 2022, 8 pages.
Jeremiah Rose "Using Raspberry Pi to flash its own SD card" Stack Exchange, Jun. 25, 2019 (https://raspberrypi.stackexchange.com/questions/99914/using-raspberry-pi-to-flash-its-own-sd-card) last accessed Mar. 21, 2022.
"Arm® Cortex®-M4 32-bit MCU+FPU, 105 DMIPS, 256KB Flash / 64KB RAM, 11 TIMs, 1 ADC, 11 comm. interfaces" ST life.augmented, Apr. 2019, 139 pages, www.st.com.
European Search Report received for EP Patent Application No. 22770748.6, mailed on Jan. 8, 2025, 10 pages.
Office Action received for Japanese Patent Application No. 2023-557684, mailed on Dec. 26, 2024, 6 pages (3 pages of English Translation and 3 pages of Original Document).
Office Action received for IN Patent Application No. 202317070685, mailed on Aug. 21, 2025, 8 pages.
Office Action received for Taiwan Patent Application No. 114107770, mailed on Sep. 10, 2025, 19 pages (8 pages of English Translation and 11 pages of Original Document).
Office Action received for Taiwan Patent Application No. 111110384, mailed on Nov. 15, 2024, 4 pages (4 pages of English Translation and 4 pages of Original Document).
Office Action received for Taiwan Patent Application No. 114107770, mailed on Jan. 13, 2026, (English Translation Included), 19 pages.

* cited by examiner

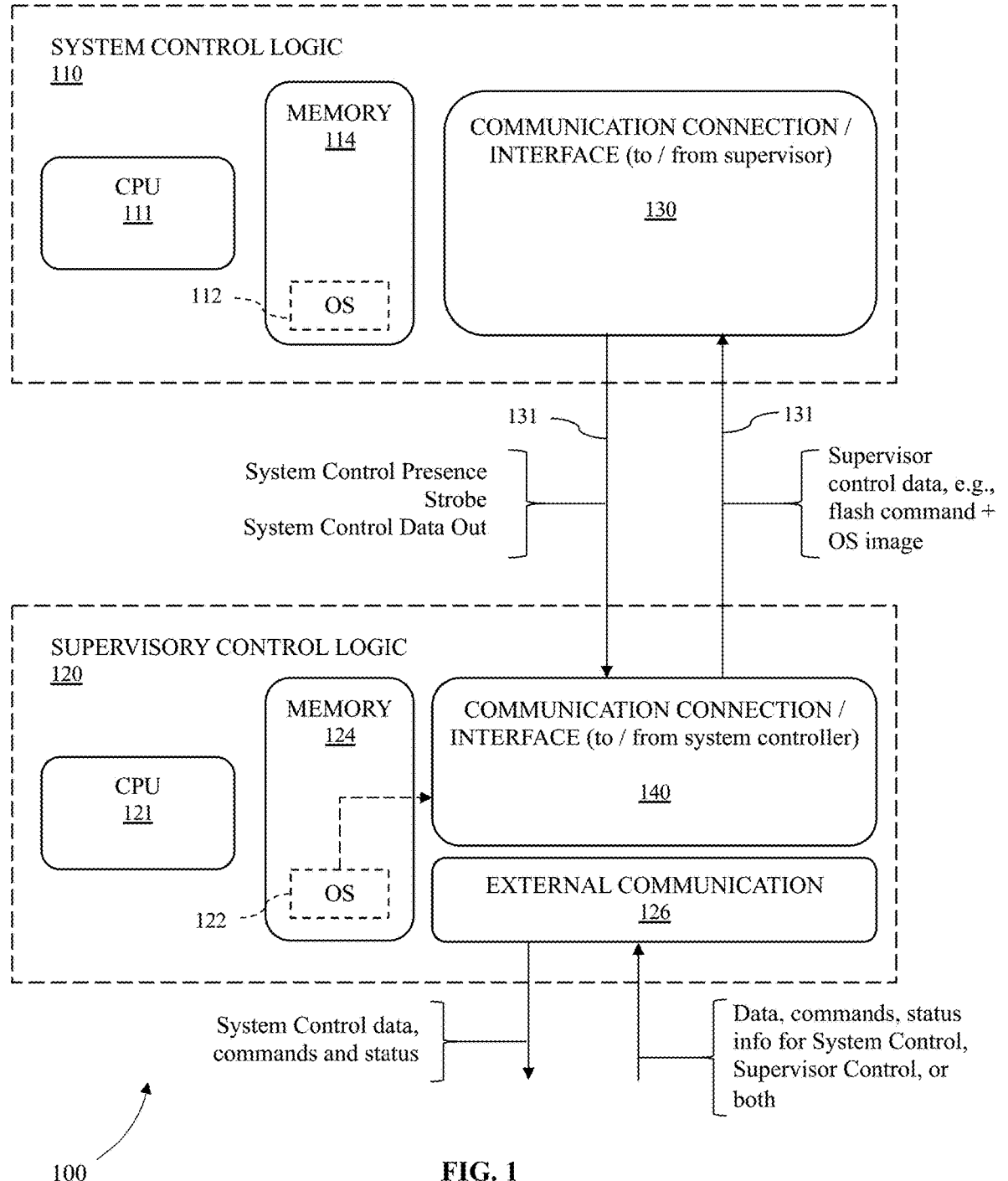

SYSTEM CONTROL LOGIC
110

CPU
111

MEMORY
114

112

OS

COMMUNICATION CONNECTION /
INTERFACE (to / from supervisor)

130

131

131

System Control Presence
Strobe
System Control Data Out

Supervisor
control data, e.g.,
flash command +
OS image

SUPERVISORY CONTROL LOGIC
120

CPU
121

MEMORY
124

122

OS

COMMUNICATION CONNECTION /
INTERFACE (to / from system controller)

140

EXTERNAL COMMUNICATION
126

System Control data,
commands and status

Data, commands, status
info for System Control,
Supervisor Control, or
both

Reservoir
310

320-1

320-n

Collection
Manifold
354

Control Logic
340

Rack of
Servers
350

Distribution
Manifold
352

Heat Exchanger
330

Environmental Heat
Exchanger
360

CONTROL SYSTEMS FOR HEAT TRANSFER SYSTEMS, AND RELATED HEAT TRANSFER SYSTEMS

CROSS-REFERENCE TO RELATED APPLICATIONS

This application claims benefit of and priority to provisional U.S. Patent Application Ser. No. 63/163,661, filed on Mar. 19, 2021, and U.S. Patent Application Ser. No. 63/174, 074, filed on Apr. 13, 2021.

Other pertinent disclosures include U.S. Pat. Nos. 8,746, 330, 9,052,252, 9,453,691, 9,496,200, 10,364,809, and 10,365,667, as well as U.S. Patent Application Publication No. 2015/0083368, co-pending U.S. patent application Ser. No. 16/158,227 and co-pending U.S. patent application Ser. No. 17/582,987.

Each foregoing patent, publication, and patent application is hereby incorporated by reference in its entirety as if fully set forth herein, for all purposes.

FIELD

This application and the subject matter disclosed herein (collectively referred to as the "disclosure"), generally concern control logic, such as, for example, microcontrollers for controlling heat-transfer systems, and related systems and methods.

BACKGROUND INFORMATION

More particularly, but not exclusively, this disclosure pertains to systems, methods, and components for monitoring, operating or improving health of a controller, e.g., a microcontroller that controls operation of a heat-transfer system, with limited or no involvement by a technician. As but one illustrative example, a supervisory control logic can monitor and direct operation of a system control logic, such as, for example, by causing the system control logic to restart, to enter a selected boot mode, to upgrade or otherwise install system or operating files, or to re-flash a memory or firmware logic.

Computer system performance and heat dissipation density continue to increase. Consequently, conventional air-cooling continues to give way to liquid-cooling in some computer system applications, including, but not exclusively, server- and data-center applications. Although commercially available liquid cooling systems are considered to be reliable, automated control of cooling systems permits a single technician to oversee operation of a significant number of servers, allowing a server installation to increase in scale with fewer technicians than manually controlled cooling systems would otherwise require. Nonetheless, known control logic for such a heat-transfer system can still require attention from a technician.

SUMMARY

According to an aspect, disclosed control logic can automate otherwise time-consuming tasks conventionally performed manually by a technician. For example, disclosed control logic can include a system control logic configured to control operation of a device or system, e.g., a heating or cooling device or system. The disclosed control logic can also include a supervisory control logic configured to monitor operation of the system control logic, to direct operation of the system control logic, or both.

In an embodiment, disclosed supervisory control logic can monitor a state-of-health of the system control logic, as for example by monitoring an output from the system control logic that is indicative of its state-of-health. In a working embodiment, the supervisory control logic can monitor an output signal, e.g., a strobe signal, emitted by the system control logic. For example, the supervisory control logic can monitor for a change in frequency of a periodic strobe signal. In this example, if the supervisory control logic detects a change in frequency of the strobe signal, e.g., beyond a threshold change in frequency, the supervisory control logic can infer that functioning of the system control logic has changed (e.g., deteriorated). Responsive to a detected change in the state-of-health of the system control logic, the supervisory control logic can issue a command or signal, or otherwise cause the system control logic to perform one or more other operations selected from a plurality of operations. As but several illustrative examples, the supervisory control logic can issue a command or signal, or otherwise cause the system control logic to restart, to enter a selected boot mode, to upgrade or otherwise install system or operating files, or to re-flash a memory store or firmware storage.

According to another aspect, this disclosure describes automated methods of monitoring operation of a system control logic, directing operation of the system control logic, or both. According to yet another aspect, computing environments configured to perform such automated methods are disclosed. Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed, as are microcontrollers having a processing unit and a memory combined in a common package or on a common semiconductor substrate.

According to still another aspect, a control system for a heat-transfer system includes a system control logic and a supervisory control logic. The system control logic has a first processor, a first memory, and a first communication connection. The first memory stores first instructions that when executed by the first processor cause the control system to control operation of the heat-transfer system and to transmit an indication of health of the system control logic from the first communication connection. The supervisory control logic has a second processor, a second memory, and a second communication connection. The second communication connection is configured to receive the indication of health from the first communication connection. The second memory stores second instructions that when executed by the second processor cause the supervisory control logic to determine a state-of-health of the system control logic responsive to the received indication of health.

In an embodiment, the second instructions, when executed by the second processor, further cause the supervisory control logic to terminate power to the system control logic responsive to the determined state-of-health being below a threshold state-of-health.

The second instructions, when executed by the second processor, can further cause the supervisory control logic to output a command signal from the second communication connection responsive to the determined state-of-health being below a threshold state-of-health. The first communication connection can be configured to receive the command signal from the second communication connection.

The first instructions, when executed by the first processor, can cause the system control logic to restart, to enter a selected boot mode, to install system files, to install operating files, to re-flash a memory or to re-flash a firmware logic.

The act of transmitting an indication of health of the system control logic from the first communication connection can include transmitting a strobe signal within a predetermined range of frequencies. In some embodiments, the act of determining a state-of-health of the system control logic responsive to the received indication of health comprises assessing whether a frequency of the strobe signal is within or without the predetermined range of frequencies.

The first memory can include a removable memory card. In some embodiments, the second instructions, when executed by the second processor, further cause the supervisory control logic to output a command signal from the second communication connection. The first communication connection can be configured to receive the command signal from the second communication connection. The first instructions, when executed by the first processor, can cause the system control logic, responsive to the command signal, to read data from an external memory store and to write the data from the external memory store to the first memory. The act of writing the data from the external memory store to the first memory, in some embodiments, does not require removal of the removable memory card.

The second instructions, when executed by the second processor, can further cause the supervisory control logic to output a command signal from the second communication connection responsive to the determined state-of-health being below a threshold state-of-health. The first communication connection can be configured to receive the command signal from the second communication connection and the system control logic can be configured to re-boot from a boot source external to the system control logic.

The system control logic can also be configured to overwrite a portion of the first memory with data received from a memory store external to the system control logic.

The second instructions, when executed by the second processor, can also cause the supervisory control logic to output a further command signal from the second communication connection. For example, the system control logic can be further configured, responsive to the further command signal, to restart and to boot from the first memory.

Heat-transfer systems controlled by such supervised control logic are also disclosed. According to another aspect, a heat-transfer system has a pump for urging a liquid to flow through the heat-transfer system, a valve for controlling a flow of the liquid through the heat-transfer system, and a sensor configured to observe a condition of the heat-transfer system. The heat-transfer system can further include a system control logic and a supervisory control logic. The system control logic is configured to selectively operate the pump, the valve, or both, responsive to an output from the sensor. The system control logic further is configured to output an indication of its health. The supervisory control logic is configured to receive the indication of health from the first system control logic and to determine a state-of-health of the system control logic responsive to the received indication of health.

The supervisory control logic can be configured to terminate power to the system control logic responsive to the determined state-of-health being below a threshold state-of-health.

The supervisory control logic can be configured to issue a command to the system control logic responsive to the determined state-of-health being below a threshold state-of-health. For example, the system control logic can be configured, responsive to the command, to restart, to enter a selected boot mode, to install system files, to install operating files, to re-flash a memory or to re-flash a firmware logic.

In some embodiments, the system control logic has a processor and a primary memory storing instructions that when executed by the processor cause the system control logic to selectively operate the pump, the valve, or both, responsive to the output from the sensor. The system control logic can also be configured, responsive to the command issued by the supervisory control logic, to read data from an external memory store and to overwrite the primary memory with the data read from the external memory store.

The primary memory can be removable from the system control logic and yet the act of writing the data from the external memory store to the primary memory does not, in some embodiments, require removal of the primary memory from the system control logic.

In some embodiments, the system control logic is configured to re-boot from a boot source external to the system control logic responsive to the command issued by the supervisory control logic.

In some embodiments, the system control logic comprises a processor and a primary memory storing instructions that when executed by the processor cause the system control logic to selectively operate the pump, the valve, or both, responsive to the output from the sensor. The system control logic can also be configured, responsive to the command issued by the supervisory control logic, to overwrite a portion of the primary memory with data received from a memory store external to the system control logic.

The system control logic can also be configured to restart and to boot from the primary memory after the data received from the external memory store has been overwritten to the primary memory.

The primary memory can include a removable memory card and the act of overwriting a portion of the primary memory with data received from a memory store external to the system control logic does not, in some embodiments, require removal of the removable memory card from the system control logic. The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

FIG. 1 shows an architectural block diagram of a supervisory control logic configured to supervise a system control logic.

DETAILED DESCRIPTION

Figure 2:
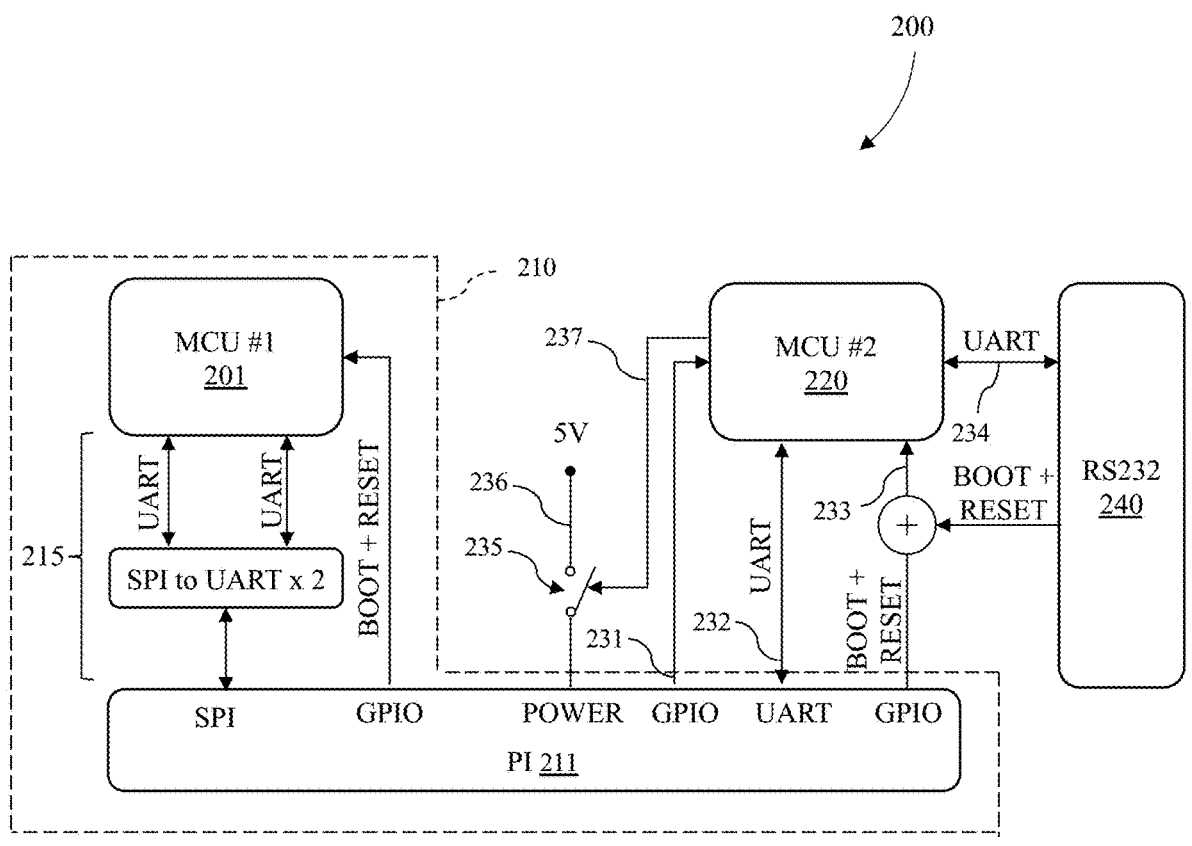
FIG. 2 schematically illustrates an embodiment of a supervised control logic.

The following describes various principles related to control logic. For example, certain aspects of disclosed principles pertain to system control logic configured to control a given system and supervisory control logic configured to monitor operation of the system control logic or to direct operation of the system control logic, or both. That said, descriptions herein of specific configurations of devices and systems, and combinations of method acts, are but particular examples chosen as being convenient to illustrate aspects of disclosed principles. One or more of the disclosed principles can be incorporated in various other systems to achieve any of a variety of corresponding system characteristics.

Thus, systems having attributes that are different from those specific examples discussed herein can embody one or more presently disclosed principles, and can be used in applications not described herein in detail. Accordingly, such alternative embodiments also fall within the scope of this disclosure.

I. OVERVIEW

While prior system control logic improved prior devices and systems by automating operation and control of such devices and systems (e.g., thermal devices and systems), prior architectures of system control logic required a technician to monitor operation of the system control logic and, under some conditions, to direct (or re-direct) its operation. Thus, although improving on prior devices and systems, prior system control logic could still limit the scale to which prior devices and systems could operate.

For example, servers installed in a given rack within a data center may be cooled by a liquid cooling system. The liquid cooling system may have one or more pumps and one or more valves for controlling a flow of a liquid coolant among the servers and to remove heat dissipated by the servers, as generally described in U.S. Pat. No. 9,496,200. The cooling system can also include one or more sensors and a system control logic. The system control logic can be configured to selectively operate the pump(s) and valve(s) responsive to system parameters observed by the sensors, e.g., as described in U.S. Pat. No. 9,052,252 and pending U.S. patent application Ser. Nos. 16/158,227 and 17/582,987.

For example, as U.S. patent application Ser. No. 17/582,987 explains, component and overall heat dissipation during computationally intensive workloads may be much higher than component and overall heat dissipation during periods of low computation activity, as when a server is primarily transferring data rather than rendering graphics or performing other computationally intensive work. Such "I/O intensive" workloads can arise, for example, when a server serves data over a network connection for a streaming application.

And, although a typical server rack of the type used in a data center can accommodate 42 individual servers, some server racks can accommodate more or fewer individual servers. Further, some server racks might not be fully populated regardless of their capacity.

Thus, a cooling system designed to provide a static rate of cooling to each server (or component or rack) assumed to be present in a given installation, e.g., based on an anticipated upper threshold level of heat dissipation by each component in each server in each rack, may adequately cool the various components when all are operating under a heavy or maximum computational workload. However, that cooling system may provide unnecessary excess cooling to the various components under other workloads, e.g., that cause one or more servers (or components) to dissipate less heat. Stated differently, a cooling system designed for an upper threshold power dissipation by all servers in a given rack (or all servers in group of racks in a datacenter) may be over designed when the upper-threshold power dissipation only occasionally occurs on a per-server basis (and perhaps rarely if at all across all servers associated with the cooling system). That is to say, the cooling system may have excess cooling capacity, or margin, under "typical" datacenter workloads.

While a selected degree of margin or excess cooling capacity may be desirable, liquid cooling systems consume power to operate, e.g., to pump a coolant through the various cooling system components. Accordingly, providing "too much" excess cooling to a server (or a group of servers) can result in less-than-optimal overall efficiency for the aggregate installation. Accordingly, some embodiments of system control logic provide a means for tailoring the cooling capacity provided by a given cooling system to an actual amount of heat being dissipated by each component, server, and/or rack in a datacenter. Such tailoring of cooling capacity can improve overall efficiency for the server installation compared to a server installation that relies on a cooling system that provides "too much" excess cooling.

In some embodiments, system control logic can tailor the cooling capacity of a cooling system to a server installation. Such tailoring can involve reducing the rate of cooling provided by a cooling system to match a server's (or a component's or a rack's) lower rate of heat dissipation during times of, for example, IO intensive operation. According to another aspect, tailoring the cooling capacity can involve matching the number of servers cooled by a given cooling system to that cooling system's overall cooling capacity. According to yet another aspect, tailoring the cooling capacity can involve adjusting one or more coolant temperatures, coolant flow rates, and/or other cooling-system parameters to adjust the rate of cooling provided by the cooling system to a selected one or more heat-dissipating components.

In an embodiment, system control logic for a liquid-cooling system can tailor operation of one or more cooling nodes to the workload of a corresponding group of electronic components, a group of servers incorporating or associated with such components, and/or a group of racks incorporating or associated with such servers. For example, a liquid-cooling system can control a flow rate of coolant throughout the cooling system, through one or more selected branches of a coolant circuit, and/or through one or more selected cooling nodes of the cooling system. In some embodiments, a controller can adjust operation of one or more pumps, one or more valves, or a combination of one or more pumps and one or more valves to tailor the cooling capacity of a selected cooling nodes to correspond to the heat dissipated by the components, servers, and/or racks cooled by the cooling nodes. Each system control logic (sometimes also referred to as a "controller") associated with a cooling system for a given rack of servers (or even a plurality of racks of servers) within a large-scale data center having many racks of servers can require a finite amount of attention from a technician. Thus, a finite number of cooling systems having such control logic can be installed before requiring attention from a second technician, and so on.

Consequently, architectures of prior system control logic can limit the ability of a cooling (or other) system to scale to ever larger installations, e.g., based on a technician's available time and attention to dedicate to monitoring and directing operation of the system control logic. This general deficiency of prior system control logic holds regardless of whether the system control logic is embodied in a general-purpose computing environment, a programmable micro-controller, an ASIC (or otherwise), though perhaps to a differing degree for each embodiment.

That being said, a control logic architecture that provides supervisory control logic configured to monitor and to direct (or redirect) operation of a system control logic can alleviate a resource bottleneck arising from limited technician availability. For example, certain monitoring and operational tasks can be off-loaded from the technician to the supervisory control logic, further automating the control and operation of a given device or system (e.g., the exemplary cooling systems briefly described above).

More particularly, but not exclusively, an auxiliary micro-controller (also referred to herein as a "supervisory control logic") can revive an otherwise inoperable main controller (also referred to herein as a "system control logic") that is un-bootable because of corrupt data in its memory. Alternatively, an auxiliary micro-controller can reconfigure a main controller, e.g., to reflect a change in data-center configuration (e.g., installation or removal of one or more servers from a rack, installation or removal of one or more racks from a plurality of racks, re-arrangement of racks within a data center, re-arrangement of servers within a rack, revised operation and/or cooling specifications, etc.).

As but one example, the system control logic can be embodied in a specially programmed, general-purpose computing environment described more fully below. For example, such a specially programmed, general-purpose computing environment is commercially available under the name Raspberry Pi, but those of ordinary skill in the art will understand and appreciate from this description that the system control logic can be embodied in various other forms without departing from presently disclosed principles. Examples of alternative embodiments of system control logic include micro-controllers, single-board computers, field-programmable gate arrays (FPGAs) and other combinations of software, firmware and hardware, as explained more fully below.

A supervisory control logic can be embodied as an "intermediate" component (e.g., software, firmware or hardware) that acts as a "transparent" external interface to the main controller, e.g., until a measure of health of the main controller declines past a threshold or until a software or firmware update to the main controller is necessary or appropriate given then-current circumstances. The supervisory control logic can, under predetermined conditions, assume a measure of control over the system control logic. For example, the supervisory control logic can cause the system control logic to restart. In some embodiments, the supervisory control logic can further cause the system control logic to restart using a specified boot sequence, causing the control logic to enter a selected boot mode. For example, the supervisory control logic can cause the system control logic to boot from a secondary file source (e.g., from a backup memory or a redundant memory store of the system control logic, or even from a memory store of the supervisory control logic). In such an embodiment, the supervisory control logic can further cause the system control logic to download updated system files, to install an updated operating system, to re-install an uncorrupted version of a current operating system, or to otherwise update or refresh its operation. In an embodiment, the supervisory control logic can cause the system control logic to re-flash a memory store (e.g., an EEPROM or flash memory on an otherwise removable SD card) without requiring intervention by a technician or even the physical removal of the memory or control logic from its physical enclosure. The software installed or re-flashed can be available from any available data store, such as, for example, a redundant memory store of the system control logic, a memory store of the supervisory control logic, or a network-connected memory store. Such a supervisory control logic can automatically repair a data-corruption error in the system control logic (or to otherwise update or revise the software of the system control logic) without the need to physically remove system control logic's memory store (e.g., a flash memory, such as, for example, an SD card). Similarly, such a supervisory control logic can provide a communication connection to the system control logic that can permit a technician to repair a data-corruption error in the system control logic (or to otherwise update or revise the software of the system control logic) without the need for physical removal of the system control logic or its memory store. Consequently, a system control logic can be updated with new or alternative software or firmware without the need to otherwise disable the underlying system (e.g., the underlying cooling system) for reworking of the system control logic outside the installation, e.g., outside the rack of servers.

The principles disclosed herein overcome many problems in the prior art and address one or more of the aforementioned or other needs. Further details of disclosed principles are set forth below. Section II describes principles pertaining to a general architecture for a supervisory control logic configured to monitor and to direct operation of a system control logic. Section III describes embodiments of cooling systems having supervised control logic as described herein. Section IV describes principles pertaining to general-purpose and special-purpose computing environments suitable for implementing disclosed technologies. And, Section V describes other embodiments of disclosed technologies.

Other, related principles also are disclosed. For example, disclosed logic can be embodied in machine-readable media containing instructions that, when executed, cause a processing unit, e.g., a processing unit of a computing environment, to perform one or more disclosed method acts. Such instructions can be embedded in software, firmware, or hardware, or in other embodiments can be distributed between or among software, firmware, and hardware components. In addition, disclosed methods and techniques can be carried out in a variety of forms of processor or controller, as in software, firmware, and hardware (and combinations thereof).

II. AN ARCHITECTURE FOR SUPERVISED CONTROL LOGIC

Referring now to FIG. 1, an architecture embodiment for supervised control logic is described. As shown in FIG. 1, a supervised control logic 100 can include a system control logic 110 and a supervisory control logic 120 operatively coupled with each other. For example, one or more communication connections 130, 140 can communicatively couple the system control logic 110 with the supervisory control logic 120, allowing the system control logic and the supervisory control logic to communicate with each other bi-directionally. The communication connection(s) 130, 140 can provide one or more communication channels 131, 132 and each channel can provide bi-directional communication or unidirectional communication (as indicated by the channels shown in FIG. 1). For a communication connection that provides only unidirectional channels, bi-directional communication between the system control logic and the supervisory control logic can be attained by providing two or more channels, with at least one channel 131 providing unidirectional communication from the system control logic to the supervisory control logic and at least one channel 132 providing unidirectional communication from the supervisory control logic to the system control logic, as in FIG. 1.

The supervisory control logic 120 can monitor operation of the system control logic 110 over the communication connection. For example, a signal output by the system control logic 110 and received by the supervisory control logic 120 can indicate that the system control logic is present, which in effect can cause the supervisory control logic to enter a monitoring state, e.g., can cause the supervisory control logic to monitor an input from the system control logic that indicates the system control logic is operating normally. For example, the system control logic 110 can output a strobe signal, e.g., a "watchdog timer," Over a communication channel 131. If a frequency of the strobe changes or the watchdog timer does not reset when expected (e.g., "times out"), the supervisory control logic 120 can interpret such change or failure to reset (or other signal indication) as a fault in operation of the system control logic. Of course, other signals can indicate other operational states or other measures of a state-of-health for the system control logic, as will be appreciated and understood by those of ordinary skill in the art following a review of this disclosure.

When the supervisory control logic 120 detects a fault or other selected operational state of the system control logic 110, the supervisory control logic can issue a command to the system control logic over the communication connection 140. The system control logic 110 can receive, process and respond to the command issued by the supervisory control logic 120. For example, the system control logic 110 can restart, reset to factory default settings, or can enter a selected boot mode. According to an embodiment, the system control logic 110 can boot from one or more alternative boot sources (e.g., distinct from a main memory store containing a primary boot software or other operating system software).

For example, the supervisory control logic 120 can issue a command signal that causes the system control logic 110 to boot from a secondary memory store 112, a network-connected memory store (not shown), or even a memory store 122 of the supervisory control logic 120. When the system control logic 110 boots from an alternative boot source, the system control logic may still retain a communication connection with its primary memory 114, e.g., over an internal bus, which can allow the system control logic to overwrite the primary memory. For example, an alternative boot source can contain a memory partition with a stored (e.g., a backup or an updated) image of an operating system for the system control logic. The supervisory control logic 120 can issue a command to the re-booted system control logic 110 to copy the stored image of the operating system to the primary memory 114 of the system control logic. Once that process completes and the image has been verified, the supervisory control logic 120 can issue a command to the system control logic 110 to restart and to boot from its primary memory 114. Once the system control logic 110 has booted and is operating, the supervisory control logic 120 can again re-enter a monitoring mode of operation.

In the monitoring mode of operation, the supervisory control logic 120 can output a signal corresponding to an operational state of the system control logic 110. For example, while the watchdog continues to timely reset, the supervisory control logic 120 can output a signal (e.g., over an external communication connection 126 indicating that the system control logic appears to be operating normally.

Further, the supervisory control logic 120 can receive data or other signals from the system control logic 110 (e.g., over the channel 131). The supervisory control logic 120 can pass the signals through to an external communication connection 126 to another computing environment (e.g., to a monitoring station observed by a technician), with or without processing the data or other signals. In another embodiment, the supervisory control logic 120 can process a data signal (e.g., received over the channel 131) and output over the external communication connection 126 a processed version of the data signal. Additionally or alternatively, the system control logic 110 can have an external communication connection (not shown) to communicate such data or other signals from the system control logic 110 to another computing environment. Further, the supervisory control logic 120 can receive input from an external source (e.g., a user interface, another computing environment, a sensor, etc.) over the external communication connection 126.

The supervisory control logic 120 can process the external input and determine whether or to what extent to issue a corresponding command to the system control logic 110. For example, a technician may wish to push a software update to the system control logic 110, despite that the system control logic remains operable. In such an instance, the supervisory control logic 120 can receive a command indicating that it needs to interrupt and reboot the system control logic 100 from another boot source. After the system control logic 110 has booted from the secondary boot source, the supervisory control logic 120 can issue a command to the system control logic to write the updated software to its primary memory 114 (e.g., in part by providing the updated software or by pointing the system control logic to another data source from which the updated software can be received).

In FIG. 1, the system control logic 110 has a processing unit (CPU) 111 coupled with a memory 114 and a bidirectional communication connection 130 or interface with the supervisory control logic 120. A bus (not shown) provides communication between and among the CPU, the memory 114 and the communication connections 130 or interfaces. The memory 114 can store instructions that when executed by the processing unit 111 cause the system control logic to perform a method act as described herein.

Similarly, the supervisory control logic 120 has a processing unit (CPU) 121 coupled with a memory 124 and a bidirectional communication connection 140 or interface. A bus (not shown) provides communication between and among the CPU 121, the memory 124 and the communication connections 140 or interfaces.

In FIG. 1, the architecture is depicted as having two separate, albeit communicatively coupled, logical structures, e.g., the system control logic 110 and the supervisory control logic 120. In practice, the system control logic 110 and the supervisory control logic 120 can be embodied in or on physically distinct devices or components or they can be embodied in software or firmware having a different physical partitioning among the processing, memory and communication resources shown in FIG. 1. Nonetheless, the logical relationships between and among those resources can remain substantially as shown in FIG. 1.

In a working embodiment, the system control logic 110 is implemented using a commercially available, general purpose computing environment offered under the mark Raspberry Pi with special-purpose software stored in or on a primary memory 1112 that, when operated, causes the general purpose computing environment to control one or more functions of a liquid cooling system for a rack of servers. As noted above, such a liquid cooling system is described in U.S. Pat. No. 9,496,200 and examples of such functions are described in U.S. Pat. No. 9,052,252 and pending U.S. patent application Ser. Nos. 16/158,227 and 17/582,987.

FIG. 2 shows a simplified schematic illustration of such an embodiment. In FIG. 2, a system control logic 210 is distributed between a first microcontroller (MCU #1) 201 and a general purpose computing environment (PI) 211 communicatively coupled with each other over a plurality of communication connections 215. Although specific communication protocols (e.g., UART, SPI) and specific connector configurations (e.g., RS232) are indicated in FIG. 2, those of ordinary skill in the art will understand and appreciate that other communication protocols (e.g., USB among a variety of other protocols) and connector configurations are possible without deviating from disclosed principles. FIG. 2 also illustrates a supervisory control logic (MCU #2) 220 communicatively coupled with the system control logic 210 using a UART connection 232. As with the architecture shown in FIG. 1, the supervisory control logic (MCU #2) 220 can monitor activity of the control logic 210 using, e.g., a watchdog timer (WDT_strobe) or other strobe signal communicated over a channel 231 and can otherwise communicate with the control logic over one or more other communication connections 232, 233. Moreover, the embodiment shown in FIG. 2 includes a physical, external communication connector (RS232) 240 that can provide the system 200 with a communication connection with an external device or system (not shown). For example, a communication connection (UART) 234 extends between the connector 240 and the supervisory control logic (MCU #2) 220. Nonetheless, those of ordinary skill in the art will understand and appreciate that the physical connection 240 need not be limited to RS232 connectors and can be any suitable connector, whether standardized or proprietary.

Similarly, another communication connection (UART) 232 extends between the supervisory control logic (MCU #2) 220 and the system control logic 210. During normal operation, the supervisory control logic 220 can receive an input communication signal from the external connection (RS232) 240 and can output a corresponding communication signal over the connection 232 to the system control logic 210. The output communication signal can be the same as the input communication signal or can be a different signal that corresponds to the input signal, but which has been processed by the supervisory control logic (MCU #2) 220.

In an embodiment, one or more communication connections alternative to or in addition to those shown in FIG. 2 are provided between the system control logic 210 and the supervisory control logic 220. As but one example, a USB communication connection (not shown) can be provided between the system control logic 210 and the supervisory control logic 220. In another embodiment, the supervisory control logic 220 is provided with the illustrated connection 232 (UART, SPI, USB) as well as another (e.g., different) communication connection. A supervisory control logic 220 with alternative communication connections can allow integrators with additional flexibility when choosing, for example, a suitable system control logic 210, which may be configured with a preferred communication connection.

Further, the supervisory control logic 220 can be operatively coupled with a relay or other switching device 235 to open or to close a power connection 236 to the system control logic 210. In FIG. 2, a connection 237 extends between the supervisory control logic 220 and the relay 235 along a 5-volt power connection 236. Although a relay 235 is shown, any suitable switching device that is controllable by the supervisory control logic 220 may be used to cause the system control logic 210 to power down and to restart. In the illustrated embodiment 200, an input signal to the supervisory control logic 220, e.g., as received from the system control logic 210 or from an external device (e.g., connector 240), can cause the supervisory control logic 220 to open or to close the power connection 236.

Figure 2A:
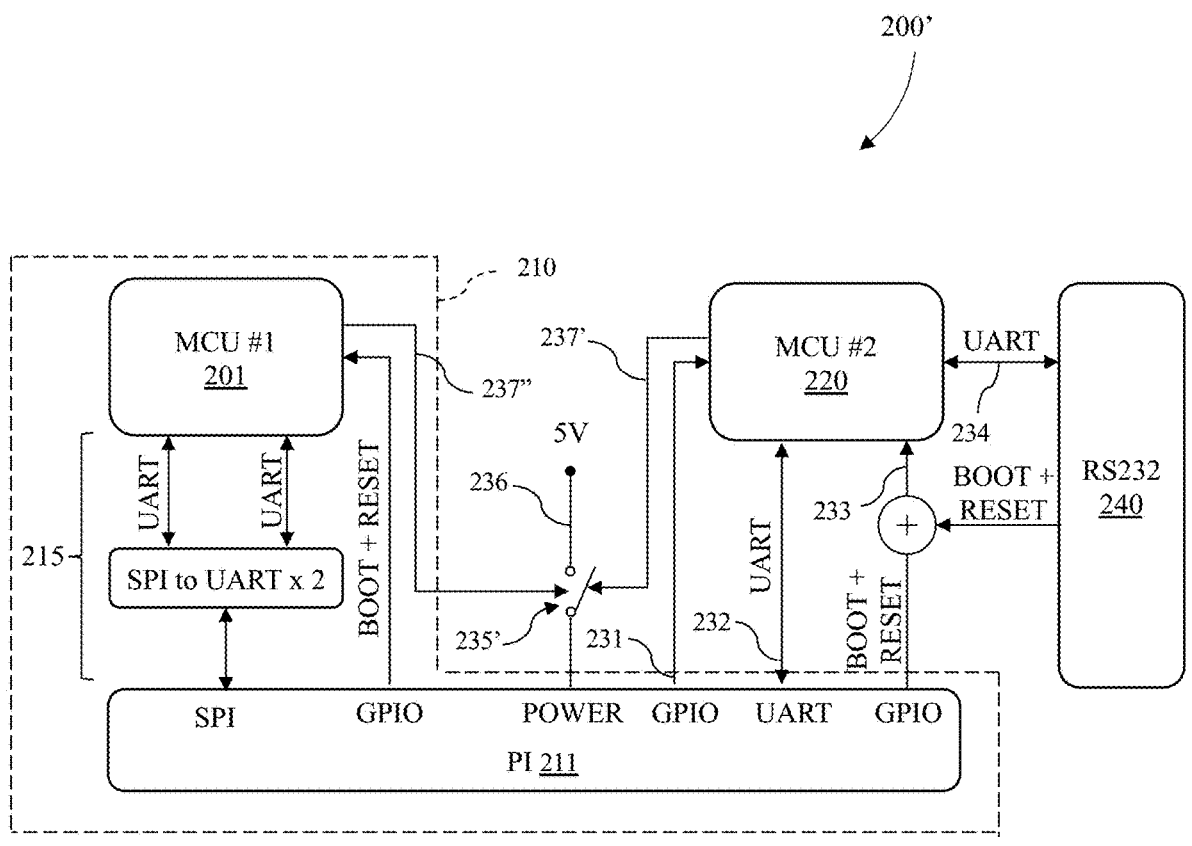
FIG. 2A schematically illustrates an alternative embodiment of a supervised control logic.

FIG. 2A shows an alternative embodiment to that shown in FIG. 2. In FIG. 2A, most features of the embodiment 200' are equivalent to those shown in the embodiment 200 depicted in FIG. 2. The alternative embodiment 200' adds an operative coupling 237" between the first microcontroller 201 and the relay 235' and maintains an operative coupling 237' between the second microcontroller 220 and the relay 235'. As above, although a relay 235' is shown in FIG. 2A, any suitable switching device that is controllable by the supervisory control logic 220 or the first microcontroller 201 may be used to cause the system control logic 210 to power down and to restart, as by interrupting the power connection 236.

In a working embodiment, the supervisory control logic 220 is implemented using a commercially available microcontroller offered by STMicro under part number STM32F401RBT6TR. Appended to provisional U.S. Patent Application No. 63/163,661 and provisional U.S. Patent Application No. 63/174,074 are further electrical schematic illustrations of a supervised control logic for a liquid cooling system for a rack of servers. The schematic illustrations depict various functions, operations and connections not described herein in detail, but such functions, operations and connections will be readily ascertained by those of ordinary skill in the art from a review of this disclosure and the schematic illustrations. Those appended schematic diagrams depict a control logic architecture as shown generally in FIGS. 1 and 2, and described in this text.

Communication connections and interfaces described herein may be provided by electrical connections between packaged components (e.g., copper or other electrically conductive traces in a printed circuit board) or by hardwiring components together. Alternatively, communication connections and interfaces may use commonly available electrical connectors (e.g., an RJ45 connector, an RS232 connector) or proprietary electrical connectors, as well as commonly available communication protocols (e.g., UART, SPI, USB) or proprietary or less well-known protocols. Wireless communication connections and interfaces also are possible using common communication protocols such as, for example, WiFi or Bluetooth, or by using proprietary wireless communication protocols. Although several exemplary communication connections are depicted as using physical communication connectors (e.g., RS232, RJ45 connectors), those of ordinary skill in the art will understand and appreciate that such communication connections and their corresponding physical connectors can be replaced by a wireless communication interface (including wireless transmitters, receivers, or transceivers, and corresponding signal processing units).

Disclosed control units can be embodied in software, firmware or hardware (e.g., an ASIC). A control unit processor may be a special purpose processor such as an application specific integrated circuit (ASIC), a general purpose microprocessor, a field-programmable gate array (FPGA), a digital signal controller, or a set of hardware logic structures (e.g., filters, arithmetic logic units, and dedicated state machines), and can be implemented in a general computing environment as described herein.

III. COOLING SYSTEM EMBODIMENTS HAVING CONTROL LOGIC

Exemplary embodiments of cooling systems that can incorporate or can be controlled by disclosed control logic are now described. The following embodiments and others are described in further detail in the one or more of U.S. Pat. Nos. 9,496,200, 9,052,252, 10,364,809, and 10,365,667, as well as U.S. Patent Application Publication No. 2015/0083368, co-pending U.S. patent application Ser. No. 16/158,227 and co-pending U.S. patent application Ser. No. 17/582,987.

Figures 3, 4:
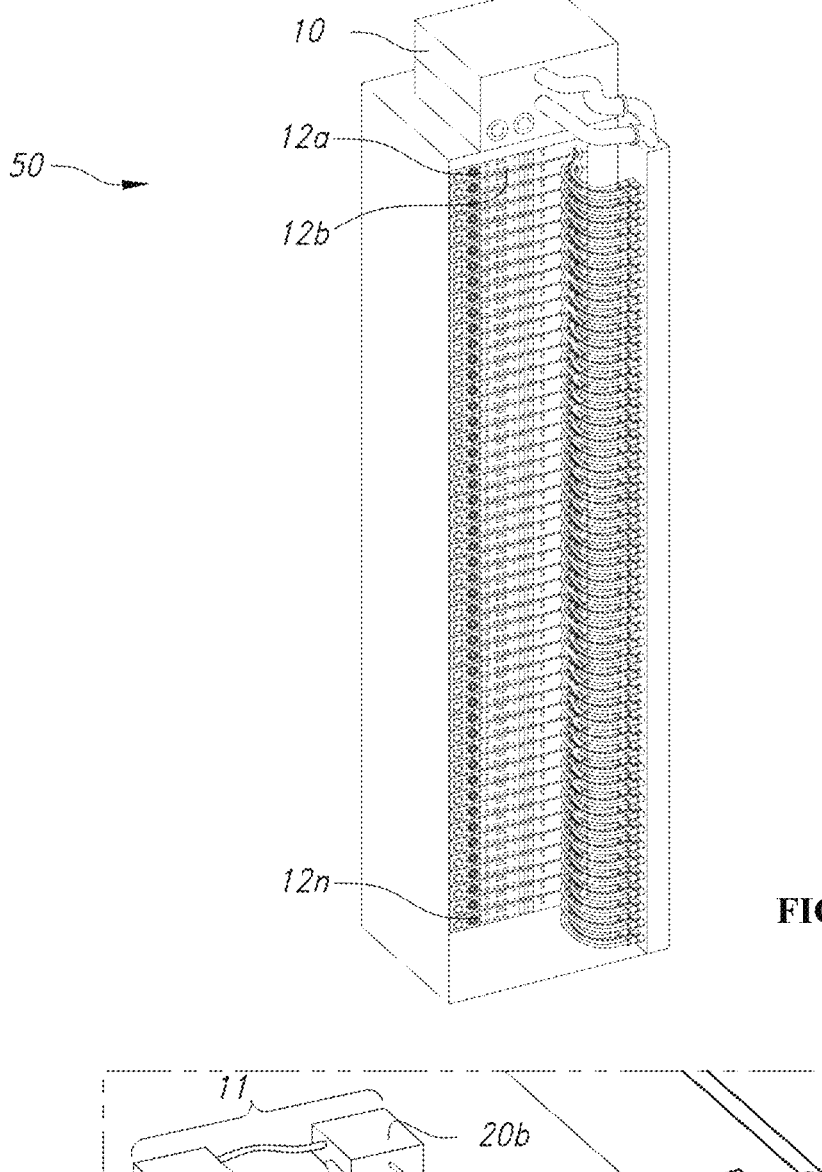
FIG. 3 shows a plurality of liquid-cooled servers mounted in a rack.
FIG. 4 shows a partially cut-away view of one of the servers shown in FIG. 3.

By way of example, FIG. 3 shows an array 50 of independently operable servers 12*a*, 12*b* . . . 12*n* mounted in a rack, or chassis, together with aspects of a modular heat-transfer system for cooling the servers. In FIG. 3, each server 12*a-n* contains one or more corresponding electronic components that dissipate heat while operating. A heat-transfer (e.g., cooling) system can use a liquid coolant to collect heat from each heat source and carry the heat to a suitable heat sink, e.g., a radiator that rejects the heat from the coolant to a facility liquid, atmospheric air, and/or air in a conditioned room containing the rack of servers.

FIG. 3 also shows a rack-level coolant-distribution unit 10. A coolant-distribution unit is sometimes referred to as a "coolant heat-exchange unit" when it incorporates a heat-exchanger to reject heat from the coolant passing through the coolant-distribution unit. In the embodiment depicted in in FIG. 3, the coolant-distribution unit 10 can have at least one pump and can also incorporate a reservoir and other components, regardless of whether the coolant-distribution unit incorporates a heat exchanger.

In the embodiment shown in FIG. 3, the coolant-distribution unit 10 incorporates a heat exchanger. When a heat exchanger is included within the confines of the coolant-distribution unit 10, as in FIG. 3, the coolant-distribution unit 10 can receive a warm coolant carrying heat from the servers 12*a-n* and facilitate transfer of that heat from the warm coolant to another medium. The coolant-distribution unit 10 can return the cooled coolant to the servers to collect further heat from the servers.

In other embodiments, a coolant-distribution unit receives cooled coolant from a heat exchanger outside the confines of the coolant-distribution unit or delivers warm coolant to an external (e.g., outside the confines of the coolant-distribution unit) heat exchanger (not shown). The external heat exchanger cools the coolant before being distributed among and through the servers 12*a-n*.

A modular cooling system as shown in FIGS. 3 and 4 can provide at least one cooling node for each server. As used herein, the term "node" means an identifiable component (or an identifiable group of components) within a system and the term "cooling node" means an identifiable component (or an identifiable group of components) that absorb(s) heat from an external source (e.g., that cools the external heat source).

For example, in context of a modular heat-transfer system for cooling one rack of 42 individual servers, the cooling system 50 can have a cooling node 11 for each server. Stated differently, the cooling system can have 42 server-cooling nodes 11, with each server-cooling node corresponding to one of the 42 servers in the rack. For example, the portion of the modular cooling system shown in FIGS. 3 and 4 provides a server-cooling node 11 for each server 12*a-n*.

Similarly, in context of a system for cooling a plurality of racks of servers, a modular cooling system can provide a rack-cooling node for each rack of servers. In FIG. 1, for example, a rack-cooling node encompasses all 42 of the server-cooling nodes 11.

In similar fashion, a given server-cooling node (or more than one of them, or all of them) can incorporate one or more component-cooling nodes. For example, if a given server has two electronic components (e.g., two processors) to be cooled by that server's server-cooling node, that server's server-cooling node can provide one component-cooling node for each electronic component to be cooled. As FIG. 4 shows, the server cooling node 11 provides a first component-cooling node 20*a* and a second component-cooling node 20*b*. The first component-cooling node 20*a* is thermally coupled with a first processor to transfer heat from the first processor to a liquid coolant passing through the first component-cooling node 20*a*. Similarly, the second component-cooling node 20*b* is thermally coupled with a second processor to transfer heat from the second processor to a liquid coolant passing through the second component-cooling node 20*b*. Representative component-cooling nodes are described in further detail in U.S. Pat. Nos. 8,746,330 and 9,453,691. The component-cooling nodes can be passive, as in the '330 patent, or they can be active, e.g., include a pump, as in the '691 patent.

FIG. 4 also depicts a portion of a coolant loop, or coolant circuit, that conveys coolant to and from the server-cooling node 11, as well as to and from each component-cooling node 20*a*, 20*b*. For example, the coolant-distribution unit 10 conveys cool coolant to a distribution manifold and receives warmed coolant from a collection manifold. The coolant loop shown in FIGS. 3 and 4 provides a branch of a fluid circuit for each server 12*a-n*. Each fluid-circuit branch receives cool coolant from the distribution manifold and conveys the cool coolant to the server-cooling node 11 where the coolant absorbs heat. Further, each fluid-circuit branch conveys warm coolant exiting from the server-cooling node 11 to the collection manifold, which returns the warmed coolant to the coolant-distribution unit 10. In the system shown in FIGS. 3 and 4, the fluid-circuit branch for each server-cooling node is fluidically coupled in parallel with the fluid-circuit branches for each of the other server-cooling nodes.

But, within the fluid-circuit branch shown in FIG. 4, the component-cooling nodes 20*a*, 20*b* are fluidically coupled with each other in series. For example, in FIG. 4, the component cooling node 20*a* receives cool coolant arriving from the coolant distribution manifold and heats the coolant with heat dissipated by the first processor. After exiting the first component-cooling node 20*a*, coolant heated by the first processor enters the second component-cooling node 20*b*, where the coolant is further heated by the second processor before returning to the coolant-distribution unit 10 by way of the collection manifold. Although not shown in FIG. 4, the component-cooling nodes 20*a*, 20*b* can be fluidically coupled with each other in parallel, which each component-cooling node receiving coolant from a corresponding further branch of the coolant circuit.

The cooling capacity of a given cooling node depends on many parameters. But, in a general sense, the available cooling capacity corresponds to a temperature of coolant entering the cooling node, a permissible increase in coolant temperature as it passes through the cooling node, and a flow rate of coolant passing through the cooling node. With all else being equal, a cooling node with a higher mass-flow rate of coolant passing through has a higher cooling capacity than it does with a lower mass-flow rate of coolant passing through. Accordingly, a cooling node that adequately cools a heat source (e.g., an electronic component, a server, or a rack of servers) that dissipates an upper threshold rate of heat will provide excess cooling to the heat source if the rate of heat dissipation by the source falls and the mass-flow rate of coolant through the cooling node remains unchanged.

Stated differently, as the rate of heat dissipated by a heat source falls, a mass-flow rate of coolant through the corresponding cooling node can be reduced. As a consequence of reducing the flow rate through the cooling node, the pressure (or head) loss due to friction through the portion of the coolant loop corresponding to the cooling node also is reduced. With such a reduction in head loss, the source of the pressure head (e.g., the pump) that drives the coolant through that cooling node may reduce its work on the coolant and thus may operate at a reduced power. For example, if a mass-flow rate of coolant through a portion of a coolant circuit can be reduced, less pressure head may be needed to urge coolant throughout the coolant loop and so it may be possible to reduce a pump speed, in turn reducing the amount of energy consumed by the cooling system. For a given rate of heat dissipated by a heat source, a reduction in mass-flow rate of coolant through the cooling node will lead to a correspondingly higher coolant-return temperature. For example, for a given rate of heat absorbed by a coolant that is assumed to be incompressible (e.g., water, a water-glycol mixture), the increase in coolant temperature across the region of heat transfer is linearly proportional to the flow rate of coolant through the region. In addition to saving energy expended by moving coolant through a cooling node, a relatively higher coolant-return temperature improves the quality of waste heat, increasing the ability to recover waste heat for useful purposes. By way of example, recovered waste heat can be used to heat domestic hot water, to heat a working fluid (e.g., water) in a hydronic heating system, and/or to perform useful work (e.g., in a power-generation or power-conversion device).

According to a disclosed aspect, a control system as described herein can receive real-time information that pertains to the rate of heat dissipated by a heat source, as well as real-time information that pertains to the cooling capacity provided by the cooling node that corresponds to the heat source. Responsive to the received real-time information, the control system can adjust, for example, the mass-flow rate of coolant through the cooling node to match the cooling capacity of the cooling node to the rate of heat dissipated by the heat source. Similarly, the control system can adjust the mass-flow rate of coolant through the cooling node to improve the quality of waste heat for useful purposes.

In an embodiment, the control system can reduce a pump speed or partially close a valve, or both, to reduce a flow rate of coolant through a given cooling node (as when the rate of heat dissipation by the heat source falls). Similarly, the control system can increase a pump speed or partially (or wholly) open a valve, or both, to increase a flow rate of coolant through the cooling node, as when the rate of heat dissipation by the heat source increases.

Figure 5:
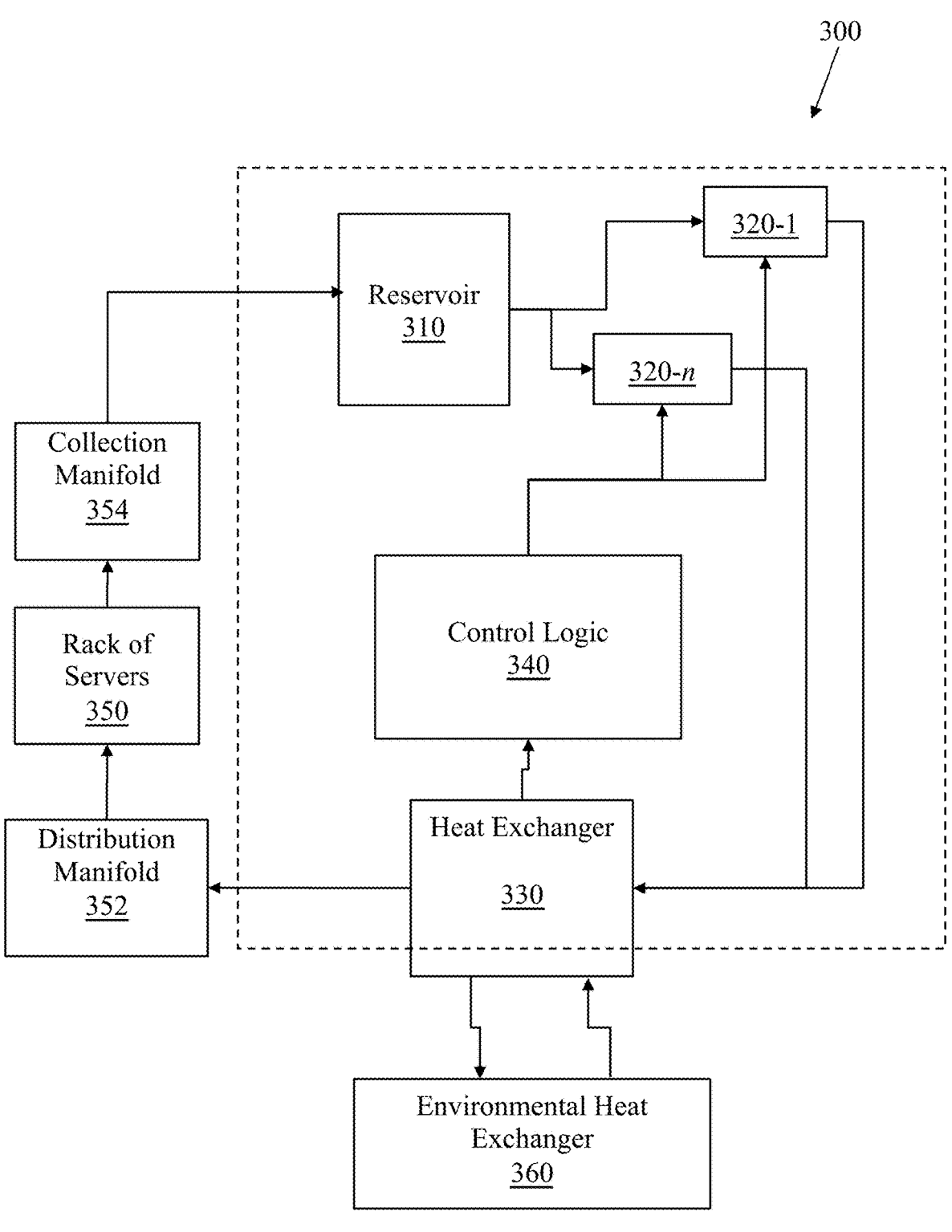
FIG. 5 schematically illustrates a closed-loop, liquid-cooling circuit suitable for cooling a plurality of rack-mounted servers as shown in FIG. 3.

According to other aspects of cooling systems suitable for being controlled by supervised control logic as described herein, FIG. 5 schematically illustrates a cooling system suitable for cooling an array of rack mounted servers 350, similar to the rack of servers 50 in FIGS. 3 and 4. In FIG. 5, the fluid conditioning unit 300 is arranged similarly to the fluid conditioning unit 10 in FIG. 3. The conditioning unit 300 includes a reservoir 310 and a plurality of distribution pumps 320-1 to 320-n. Coolant collected from the rack of servers 350 (e.g., by a collection manifold 354) can flow into the reservoir 310 and can be pumped by the distribution pump(s) 320-1 to 320-n to an environmental coupler (e.g., a heat exchanger 330). In the environmental coupler, heat carried by the coolant can be transferred to another medium (e.g., facility water cooled by an environmental heat exchanger 360), cooling the coolant flowing through the environmental coupler. The cooled coolant can then pass back to the rack of servers 350 (e.g., distributed among the plurality of servers in the rack by the distribution manifold 352).

In FIG. 5, the fluid conditioning unit 300 includes control logic 340, e.g., analogous to control logic described in connection with FIGS. 1 and 2. The control logic can receive information from one or more sensors operatively coupled with any of the components, devices, structures, mechanisms, racks, servers, heat-transfer systems, processing units, computing environments, actuators, etc., described herein. The control logic can process the received information and, responsive to an output of such processing, can emit one or more signals, commands, etc. A component, device, structure, mechanism, rack, server, heat-transfer system, processing unit, computing environment, actuator, etc., described herein can receive an emitted signal or command. Such component, device, structure, mechanism, rack, server, heat-transfer system, processing unit, computing environment, actuator, etc., described herein can respond to a received signal or command emitted by the control logic. Control logic can be implemented in a general purpose computing environment, in an application specific integrated circuit, or in a combination of hardware and software (e.g., firmware).

As an example, a coolant distributer (sometimes also referred to as a fluid conditioning unit) can have a variety of temperature, flow-rate, and/or pressure sensors arranged to observe temperature, flow-rate and pressure (e.g., static and/or stagnation) at one or more selected locations within a fluid circuit (open or closed). A controller can adjust operation of one or more coolant (e.g., a pump, a valve) and/or heat-transfer components (e.g., a logic or other component of a computing environment) to achieve desired flow and/or cooling characteristics.

As but one example, if a static pressure difference across an inlet to and an outlet from a selected fluid circuit (or branch thereof) exceeds a selected upper threshold pressure, one or more pumps can be throttled, as by slowing an impeller speed, thereby reducing the static pressure difference across the inlet and the outlet. Alternatively, if the static pressure difference across the inlet and the outlet falls below a selected lower threshold pressure difference, the one or more pumps can be operated at a higher impeller speed and/or one or more additional pumps can be "brought online" to supplement or augment available pressure head and flow delivery.

As another example, measurement of observable state-variables (e.g., temperature, static pressure, mass, density) combined with known measures of selected properties (e.g., specific heat, heat capacity, compressibility, gas constant, equation-of-state) of a given fluid and/or observable system performance characteristics (e.g., power dissipation from a heat source), health and robustness of system sensors can be assessed, as by control logic, and communicated to a system user or manager. For example, some disclosed systems, controllers and methods can compute values of state variables at one or more selected locations within a selected fluid circuit (or branch thereof) and compare the computed value to an observed value detected from a given sensor.

If an absolute value of a difference between the computed value and the observed value exceeds a selected threshold difference, an innovative control logic, system, controller, or method implemented in control logic, can determine a fault has occurred and can take a remedial action, as by setting a flag, sending an e-mail, and/or initiating an alarm to alert a user of the determined fault. Such a fault can indicate a failed or failing sensor, a leak, an over temperature condition, a failed pump, an under-speed pump, an over-speed pump, a failed or failing controller (e.g., a pump controller).

Disclosed systems, controllers, control logic and methods also provide for automatic control of external fill systems. For example, a disclosed coolant distributer can have a relay or other control output to cause an external pump (e.g., a pump associated with an external fill kit) to actuate in correspondence with a pump associated with the coolant distributer. The relay or other control output can be actuated responsive to an observed and/or computed state of a coolant circuit (or branch thereof). For example, a bleed-valve can be opened to permit a compressible gas escape from a conduit as the conduit fills with a coolant fluid (e.g., a substantially incompressible liquid). A fluid sensor or a leak detector can determine the conduit is full, as when a selected measure of the fluid is detected within or without the conduit. Responsive to such detection, the relay or other control output can cause the external pump to slow or cease operation, to speed up or increase operation, can open or close a selected valve, and/or cause an internal pump to slow, cease operation, speed up, or increase operation to achieve a desired outcome.

In yet another example, a pressure-relief or check-valve can open to permit a fluid to by-pass a selected fluid circuit or branch thereof responsive to a selected measure of a fluid's state exceeding or falling below a selected threshold. For example, the valve can open to allow a fluid to by-pass a closed fluid conduit, as to prevent a pump from "dead heading" (e.g., operating without a flow of fluid through the pump), as such "dead heading" can cause a pump to overheat and, eventually, to fail or otherwise be damaged.

The control logic 340 (or any other control logic described herein) may include instructions, e.g., stored on a memory, and a processing unit configured to execute the instructions. The control logic 340 may be communicatively coupled to the pump 320. The control logic 340 may, for example, be configured to start and stop the pump 1420. The control logic 340 may receive information from any of the pumps 320-1 to 320-n or from a sensor observing an operational parameter about the pump. Such sensors can include, among others, a temperature sensor so positioned relative to a fluid as to provide a signal corresponding to a temperature of a fluid within the conduit or a temperature of a surface, a pressure sensor so positioned as to provide a signal corresponding to a relative pressure difference between a static pressure in a liquid and a selected reference pressure, a speed sensor (e.g., a tachometer) configured to provide a signal corresponding to a rotational speed of a pump, a float sensor or other sensor configured to provide a signal corresponding to a coolant level in the reservoir, and a humidity sensor configured to provide a signal corresponding to one or more of an absolute humidity, a relative humidity, a wet-bulb temperature and a dry-bulb temperature. In general, such a sensor can observe a thermodynamic quantity, or an operational parameter indicative of a thermodynamic quantity.

The control logic 340 may be communicatively coupled to the operational block 1430. The control logic 340 may receive information from one or more sensors within the operational block 330. For example, the received information may include temperature, pressure, flow rate, or a liquid level at one or more points in the block, or any other thermodynamic quantity relating to the flow or a condition of a component in the conditioning unit 300, the pump 360, or another component.

The control logic 340 may be communicatively coupled to the various components of the fluid conditioning unit 300 through a wired connection, a wireless connection, or both. A communication bus may be configured to send and receive control signals and sensor information to and from a processing unit and/or memory of the control logic. Such signals can include any type of signal suitable for conveying information, including wired and wireless signals, e.g., radio frequency (RF), infrared (IR), microwave and photonic signals.

The control logic 340 may also be communicatively coupled to a valve (not shown) positioned between an outlet of the pump 320 and the inlet 314 to the reservoir. The control logic 340 may communicate a signal to the valve to cause the valve to open, e.g., to release gas from within the system.

IV. COMPUTING ENVIRONMENTS

Figure 6:
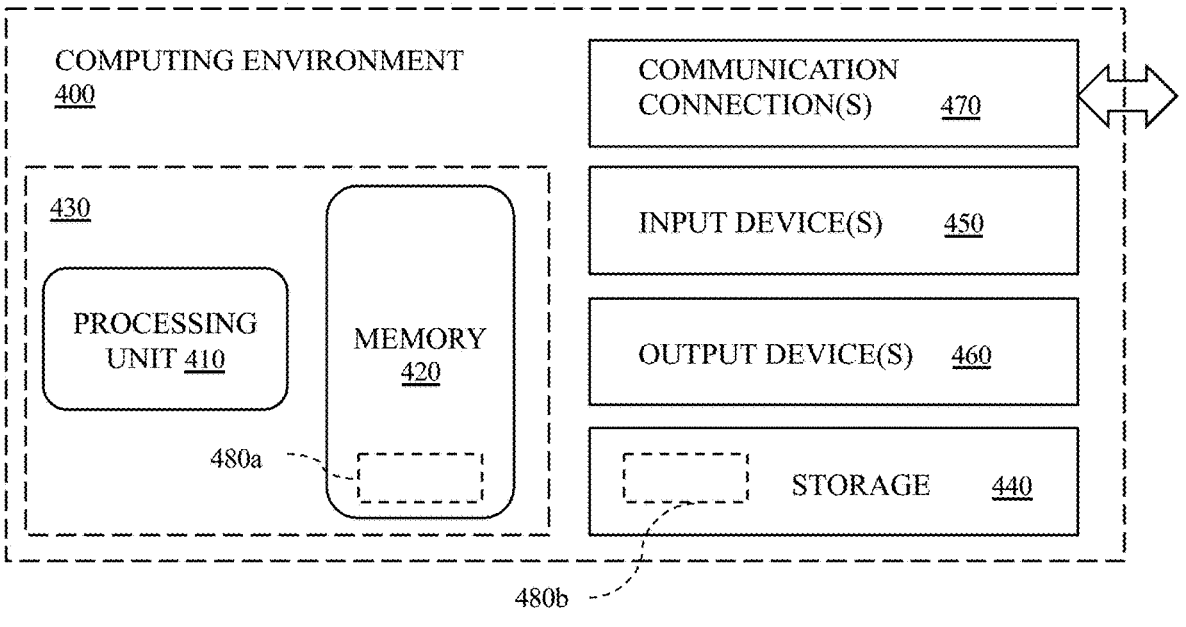
FIG. 6 shows a block diagram of a computing environment suitable for implementing disclosed technologies.

FIG. 6 illustrates a generalized example of a suitable computing environment 400 in which described methods, embodiments, techniques, and technologies relating, for example, to maintaining a temperature of a logic component and/or a power unit below a threshold temperature can be implemented. The computing environment 400 is not intended to suggest any limitation as to scope of use or functionality of the technologies disclosed herein, as each technology may be implemented in diverse general-purpose or special-purpose computing environments. For example, each disclosed technology may be implemented with other computer system configurations, multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 400 includes at least one central processing unit 410 and a memory 420. In FIG. 6, this most basic configuration 430 is included within a dashed line. The central processing unit 410 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 410 being represented by a single functional block. A processing unit can include an application specific integrated circuit (ASIC), a general purpose microprocessor, a field-programmable gate array (FPGA), a digital signal controller, or a set of hardware logic structures arranged to process instructions.

The memory 420 may be volatile memory (e.g., registers, cache, RAM), non-volatile memory (e.g., ROM, EEPROM, flash memory, etc.), or some combination of the two. The memory 420 stores software 480*a* that can, for example, implement one or more of the technologies described herein, when executed by a processor.

A computing environment may have additional features. For example, the computing environment 400 includes storage 440440, one or more input devices 450, one or more output devices 460, and one or more communication connections 470. An interconnection mechanism (not shown) such as a bus, a controller, or a network, interconnects the components of the computing environment 400. Typically, operating system software 480*b* provides an operating environment for other software executing in the computing environment 400, and coordinates activities of the components of the computing environment 400.

The storage 440 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 400. The storage 440 can store instructions for the software 480, which can implement technologies described herein.

The storage 440 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hard-wired circuit components.

The input device(s) 450 may be any one or more of the following: a touch input device, such as a keyboard, keypad, mouse, pen, touchscreen, touch pad, or trackball; a voice input device, such as a microphone transducer, speech-recognition software and processors; a scanning device; or another device, that provides input to the computing environment 400. For audio, the input device(s) 450 may include a microphone or other transducer (e.g., a sound card or similar device that accepts audio input in analog or digital form), or a computer-readable media reader that provides audio samples to the computing environment 400.

The output device(s) 460 may be any one or more of a display, printer, loudspeaker transducer, DVD-writer, or another device that provides output from the computing environment 400.

The communication connection(s) 470 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 400. By way of example, and not limitation, with the computing environment 400, machine-readable media include memory 420, storage 440, communication media (not shown), and combinations of any of the above. Tangible machine-readable (or computer-readable) media exclude transitory signals.

As explained above, some disclosed principles can be embodied in a tangible, non-transitory machine-readable medium (such as microelectronic memory) having stored thereon instructions. The instructions can program one or more data processing components (generically referred to here as a "processor") to perform processing operations described above, including estimating, computing, calculating, measuring, adjusting, sensing, measuring, filtering, addition, subtraction, inversion, comparisons, and decision making (such as by the control unit). In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

V. OTHER EMBODIMENTS

The examples described above generally concern apparatus, methods, and related systems to automate control of a machine, device, or system.

Nonetheless, the previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, the description of each control-logic example above is made in relation to a heating device or system or a cooling device or system. Nonetheless, disclosed control logic is not so limited. Rather, control-logic principles and technologies disclosed herein can be used in conjunction with myriad other devices or systems. For example, disclosed control-logic can monitor, operate or improve health of a controller that itself controls any device or system subject to control or automation, regardless of whether the device or system is designed or used for personal, business, industrial, terrestrial or extra-terrestrial, transportation, manufacturing, or other, purpose. Such devices and systems can include, by way of example and not limitation, a thermal (heating or cooling) device or system as used in the examples above, a haptic device or system as used in a single-user or multi-user gaming system (e.g., e-sports), a lighting device or system as used in residential, agricultural, office, leisure and/or industrial settings, an audio device or system, a robotic device or system, a transportation device or system, a fuel device or system, an industrial cleaning or assembly device or system, or any of myriad other devices or systems implemented for a variety of other purposes.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of supervised control logic structures, devices, and systems, and related methods and systems automate controls. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of supervised control logic embodiments that can be devised using the various concepts described herein.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

This disclosure, including the accompanying drawings and the appended electrical schematics, are not intended to be limited to the embodiments shown herein, but are to be accorded the full scope consistent with the principles they represent. Reference to a feature in the singular, such as by use of the article "a" or "an" is not intended to mean "one and only one" unless specifically so stated, but rather "one or more". Further, in view of the many possible embodiments to which the disclosed principles can be applied, we reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We currently claim:

1. A control system for a heat-transfer system, the control system comprising:
  a system control logic having a first processor, a first memory, and a first communication connection, the first memory storing first instructions that when executed by the first processor cause the control system to transmit an indication of health of the system control logic from the first communication connection and to control operation of the heat-transfer system; and
  a supervisory control logic having a second processor, a second memory, and a second communication connection configured to receive the indication of health from the first communication connection, the second memory storing second instructions that when executed by the second processor cause the supervisory control logic to determine a state-of-health of the system control logic responsive to the received indication of health and, responsive to the determined state-of-health being below a selected threshold state-of-health, to output a command signal to selectively operate the system control logic,
  wherein the second instructions, when executed by the second processor, further cause the supervisory control logic to output the command signal from the second communication connection responsive to the determined state-of-health being below a threshold state-of-health,
  wherein the first communication connection is configured to receive the command signal from the second communication connection and, responsive to receiving the command signal output by the supervisory control logic, the system control logic is configured to re-boot from a boot source external to the system control logic.

2. The control system according to claim 1, wherein the change in operational condition the system control logic comprises a termination of power to the system control logic.

3. The control system according to claim 1, wherein the second instructions, when executed by the second processor, further cause the supervisory control logic to output the command signal from the second communication connection, wherein the first communication connection is configured to receive the command signal from the second communication connection and the first instructions, when executed by the first processor, cause the system control logic to restart, to enter a selected boot mode, to install system files, to install operating files, to re-flash a memory or to re-flash a firmware logic.

4. The control system according to claim 1, wherein the act of transmitting an indication of health of the system control logic from the first communication connection comprises transmitting a strobe signal within a predetermined range of frequencies.

5. The control system according to claim 4, wherein the act of determining a state-of-health of the system control logic responsive to the received indication of health comprises assessing whether a frequency of the strobe signal is within or without the predetermined range of frequencies.

6. The control system according to claim 1, wherein the first memory comprises a removable memory card.

7. The control system according to claim 6, the second instructions, when executed by the second processor, further cause the supervisory control logic to output the command signal from the second communication connection, wherein the first communication connection is configured to receive the command signal from the second communication connection and the first instructions, when executed by the first processor, cause the system control logic, responsive to the command signal, to read data from an external memory store and to write the data from the external memory store to the first memory.

8. The control system according to claim 7, wherein the act of writing the data from the external memory store to the first memory does not require removal of the removable memory card.

9. The control system according to claim 1, wherein the system control logic is further configured to overwrite a portion of the first memory with data received from a memory store external to the system control logic.

10. The control system according to claim 9, wherein the second instructions, when executed by the second processor, further cause the supervisory control logic to output a further command signal from the second communication connection, wherein the system control logic is further configured, responsive to the further command signal, to restart and to boot from the first memory.

11. A heat-transfer system having a pump for urging a liquid to flow through the heat-transfer system, a valve for controlling a flow of the liquid through the heat-transfer system, and a sensor configured to observe a condition of the heat-transfer system, the heat-transfer system comprising:

a system control logic configured to selectively operate the pump, the valve, or both, responsive to an output from the sensor, the system control logic further configured to output an indication of its health; and a supervisory control logic configured to receive the indication of health from the system control logic, to determine a state-of-health of the system control logic responsive to the received indication of health, and to output a command responsive to the determined state-of-health being below a threshold state-of-health, wherein, responsive to receiving the command output by the supervisory control logic, the system control logic is configured to re-boot from a boot source external to the system control logic.

12. The heat-transfer system according to claim 11, wherein the supervisory control logic is configured to terminate power to the system control logic responsive to the command.

13. The heat-transfer according to claim 11, wherein the system control logic is configured, responsive to the command, to restart, to enter a selected boot mode, to install system files, to install operating files, to re-flash a memory or to re-flash a firmware logic.

14. The heat-transfer system according to claim 11, wherein the system control logic comprises a processor and a primary memory storing instructions that when executed by the processor cause the system control logic to selectively operate the pump, the valve, or both, responsive to the output from the sensor, the system control logic being further configured, responsive to the command, to read data from an external memory store and to overwrite the primary memory with the data read from the external memory store.

15. The heat-transfer system according to claim 14, wherein the primary memory is removable from the system control logic and wherein the act of writing the data from the external memory store to the primary memory does not require removal of the primary memory from the system control logic.

16. The heat-transfer system according to claim 11, wherein the system control logic comprises a processor and a primary memory storing instructions that when executed by the processor cause the system control logic to selectively operate the pump, the valve, or both, responsive to the output from the sensor, the system control logic being further configured, responsive to the command, to overwrite a portion of the primary memory with data received from a memory store external to the system control logic.

17. The heat-transfer system according to claim 16, wherein the system control logic is further configured to restart and to boot from the primary memory after the data received from the external memory store has been overwritten to the primary memory.

18. The heat-transfer system according to claim 16, wherein the primary memory comprises a removable memory card and the act of overwriting a portion of the primary memory with data received from a memory store external to the system control logic does not require removal of the removable memory card from the system control logic.

* * * * *